United States Patent
Steele et al.

(10) Patent No.: US 6,201,534 B1
(45) Date of Patent: *Mar. 13, 2001

(54) TRACKBALL FOR SINGLE DIGIT CONTROL OF WIRELESS TERMINAL

(75) Inventors: Ben Steele, Quinlan; Leopold Bömer, McKinney, both of TX (US); William Beyda, Cupertino, CA (US)

(73) Assignee: Siemens Information and Communications Networks, Inc., Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,030

(22) Filed: Oct. 3, 1997

(51) Int. Cl.[7] .................................................. G09G 5/08
(52) U.S. Cl. .................... 345/157; 345/167; 345/164; 345/168
(58) Field of Search .................... 345/167, 164, 345/156, 157, 161, 168, 169, 184

(56) References Cited

U.S. PATENT DOCUMENTS

| Re. 34,931 | 5/1995 | Duchon | 250/221 |
|---|---|---|---|
| D. 363,710 | 10/1995 | Mateus et al. | D14/114 |
| D. 372,231 | 7/1996 | Huang | D14/114 |
| 4,398,086 * | 8/1983 | Smith, III | 463/46 |
| 4,550,221 | 10/1985 | Mabusth | 178/18.06 |
| 4,585,908 | 4/1986 | Smith | 379/93.18 |
| 4,886,941 | 12/1989 | Davis et al. | 178/19.01 |
| 4,913,387 | 4/1990 | Tice | 244/135 R |
| 5,122,654 | 6/1992 | Koh et al. | 250/221 |
| 5,231,380 | 7/1993 | Logan | 345/156 |
| 5,332,322 | 7/1994 | Gambara | 400/484 |
| 5,414,445 | 5/1995 | Kaneko et al. | 345/163 |
| 5,424,756 | 6/1995 | Ho et al. | 345/158 |
| 5,425,077 | 6/1995 | Tsoi | 455/566 |
| 5,436,954 | 7/1995 | Nishiyama et al. | 455/566 |
| 5,457,480 * | 10/1995 | White | 345/163 |
| 5,463,388 | 10/1995 | Boie et al. | 341/33 |
| 5,528,523 | 6/1996 | Yoshida | 708/141 |
| 5,543,821 | 8/1996 | Marchis et al. | 345/167 |
| 5,563,631 * | 10/1996 | Masunaga | 345/169 |
| 5,572,237 | 11/1996 | Crooks et al. | 345/156 |
| 5,583,541 | 12/1996 | Solhjell | 345/163 |
| 5,583,560 | 12/1996 | Florin et al. | 348/7 |
| 5,589,893 | 12/1996 | Gaughan et al. | 348/734 |
| 5,675,360 * | 10/1997 | Takegoshi et al. | 345/167 |
| 5,708,562 * | 1/1998 | Agata et al. | 361/683 |

* cited by examiner

Primary Examiner—William A. Cuchlinski, Jr.
Assistant Examiner—Marthe Y. Marc-Coleman

(57) ABSTRACT

A side-mounted cursor pointing device 108 for a wireless terminal 100 including a sliding cover 110. The sliding cover 110 slides over the cursor pointing device 108 in an off position. When the cover 110 is slid off the cursor pointing device 108, a biasing member 212 upon which the cursor pointing device 108 rests allows the cursor pointing device 108 to pop into position and allows the user to press down on the cursor pointing device 108 in order to make a selection. The sliding cover is preferably an on-off switch for the wireless terminal.

18 Claims, 8 Drawing Sheets

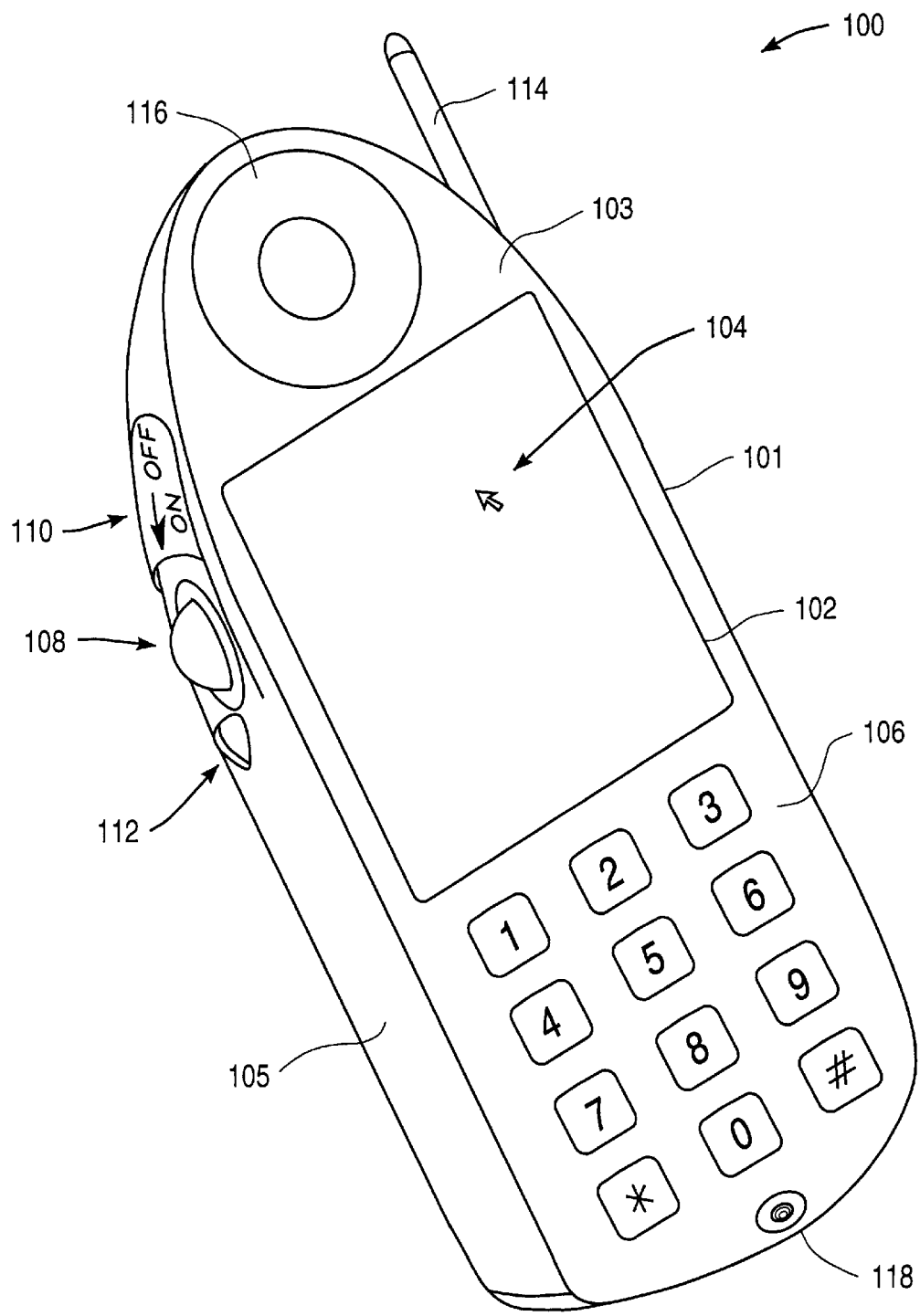
FIG_1

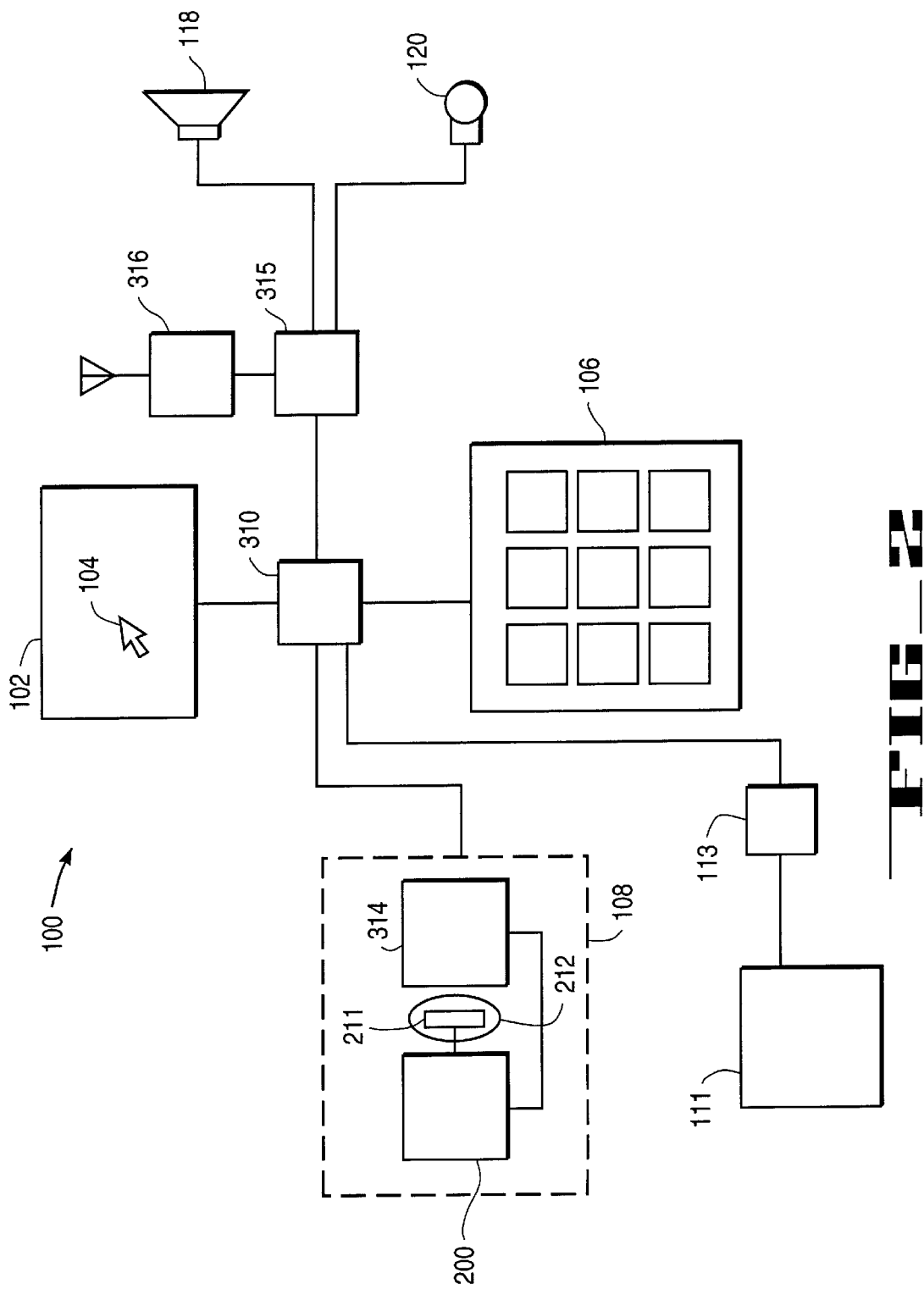

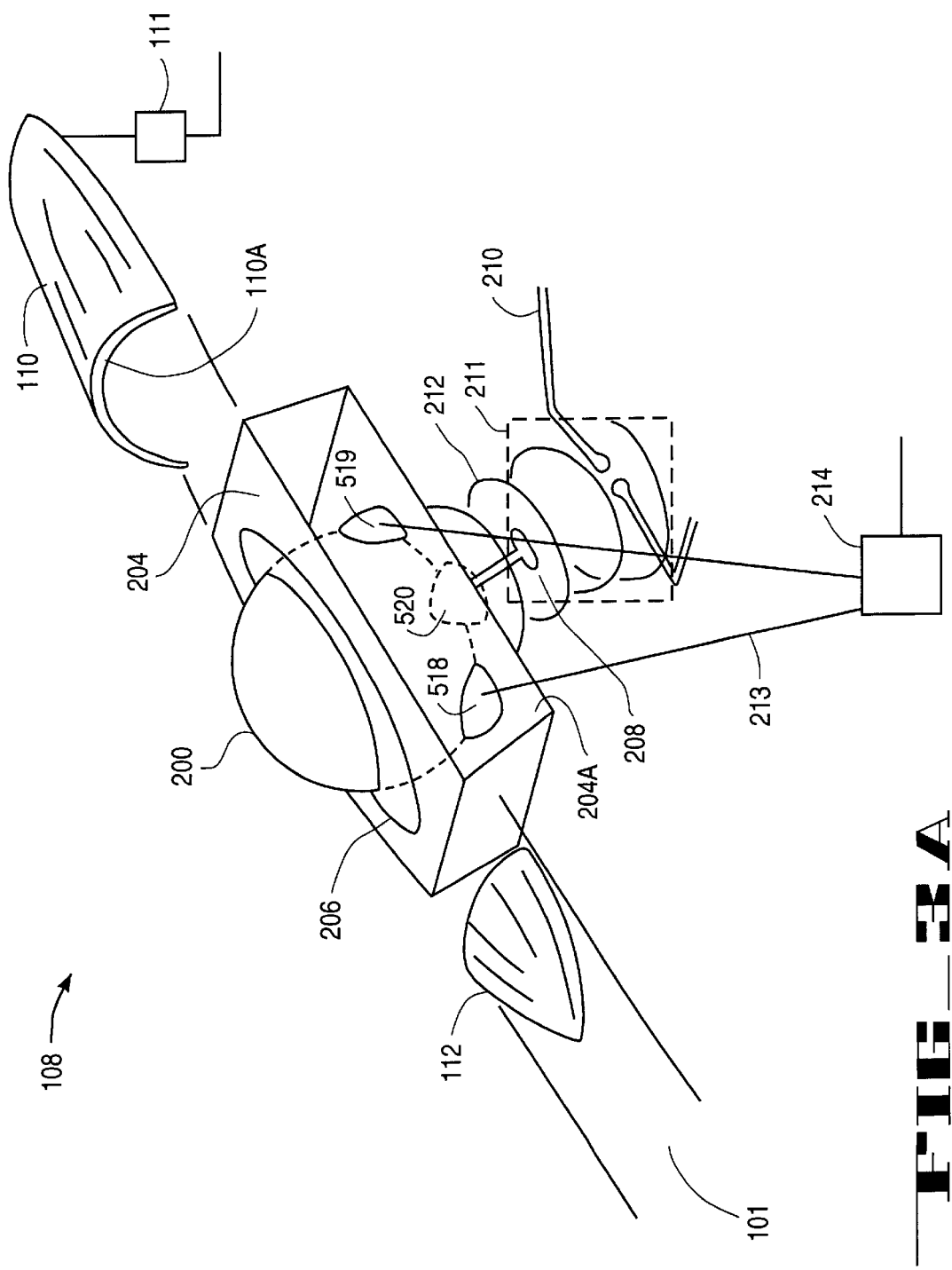

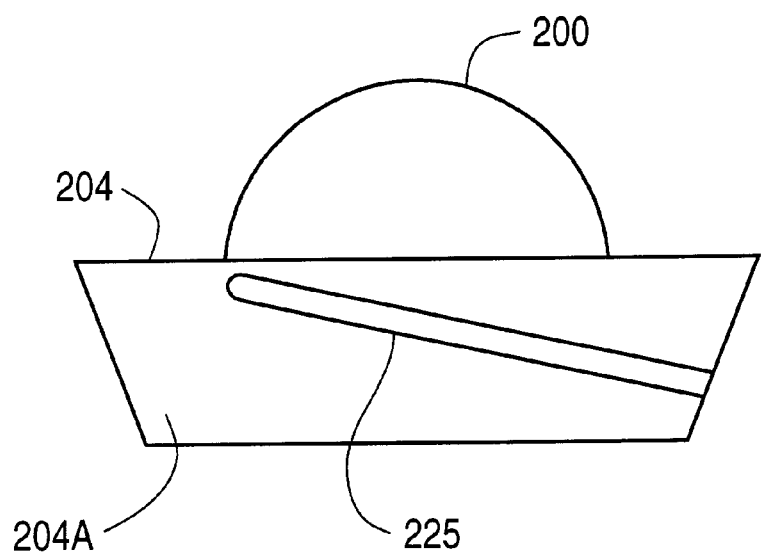
FIG_3B
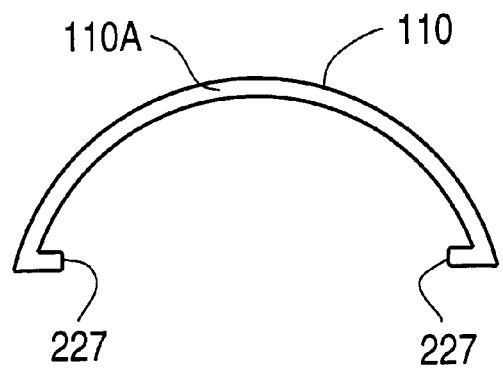
FIG_3C

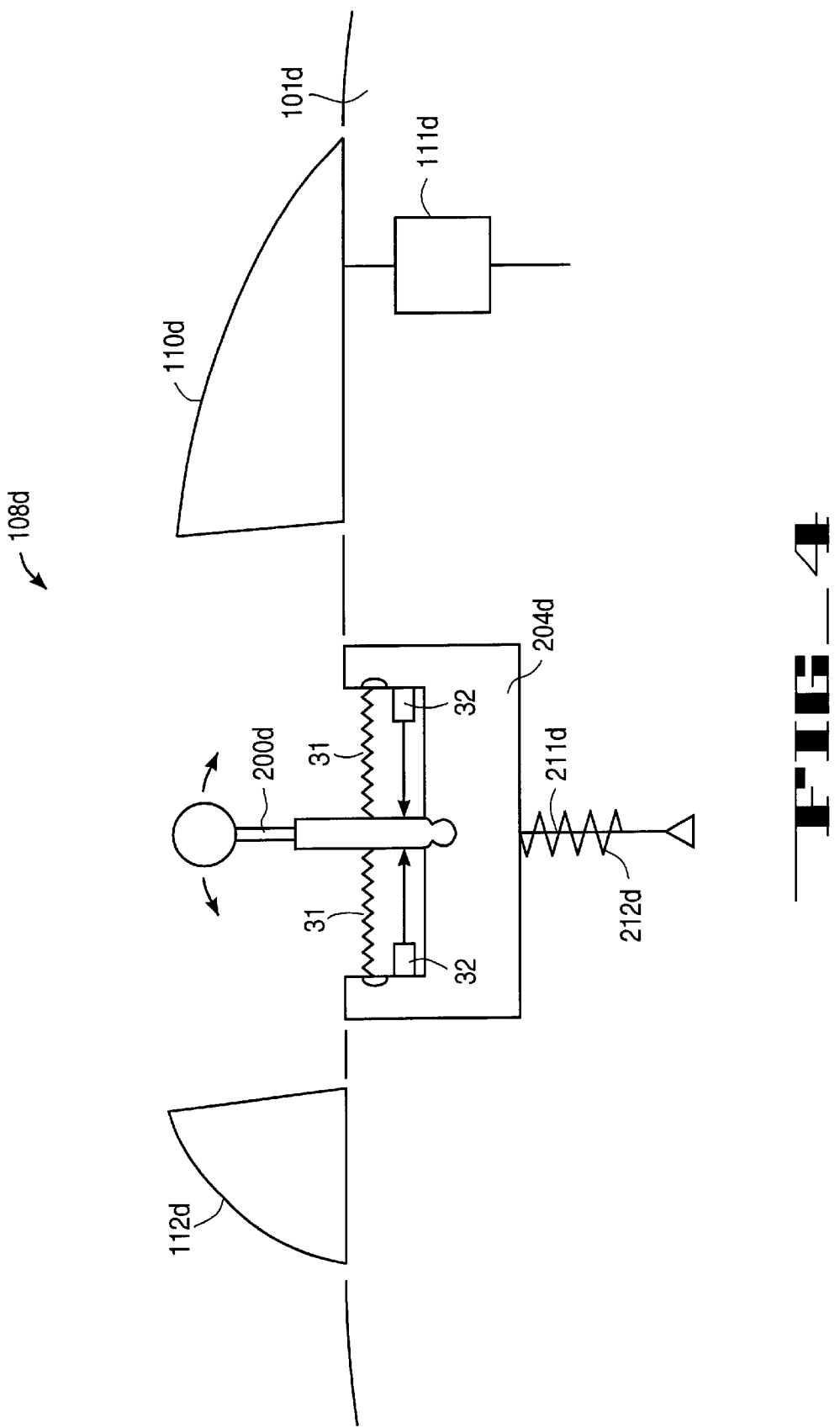

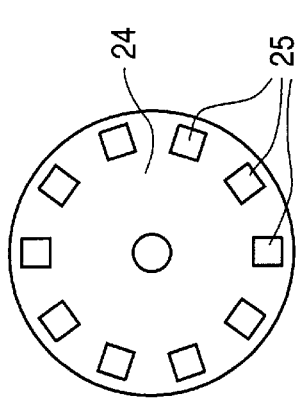
FIG_5C
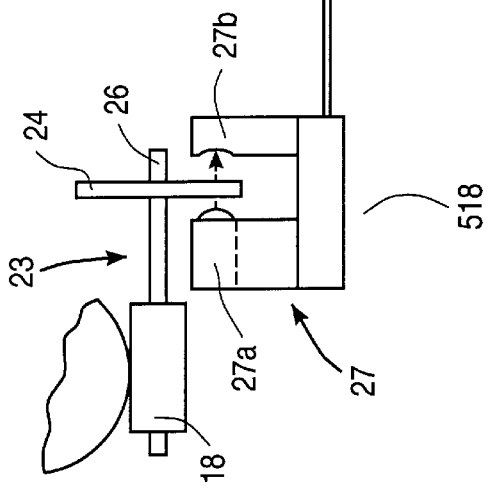
FIG_5B
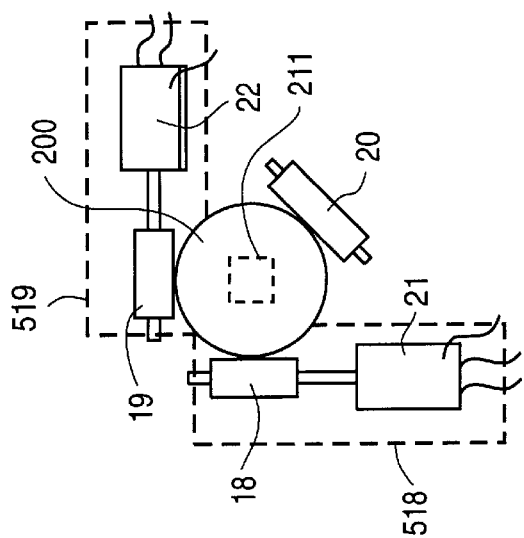
FIG_5A

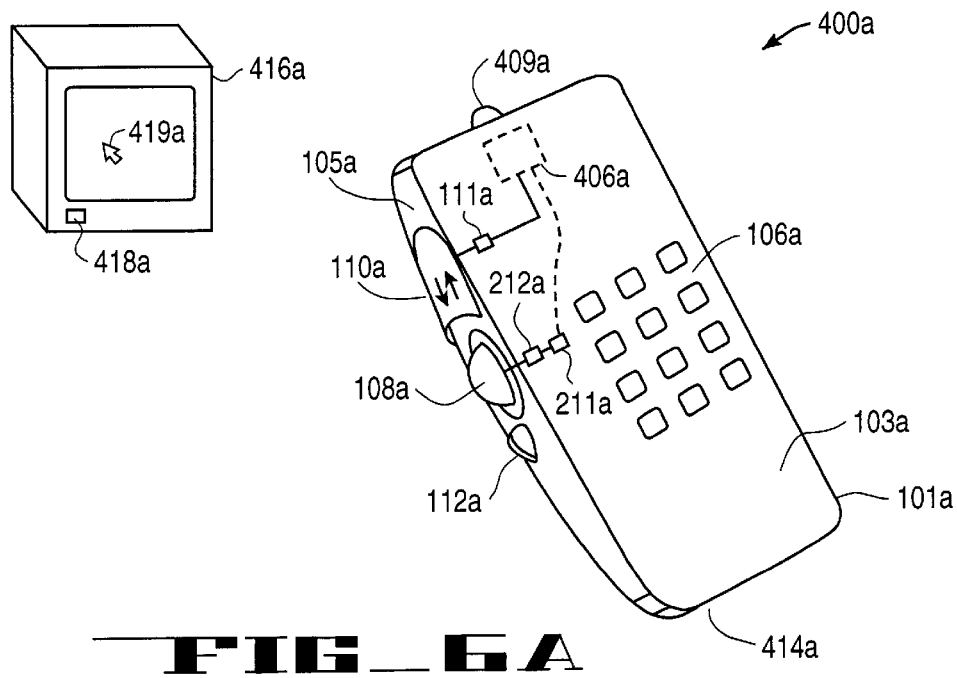
FIG_6A
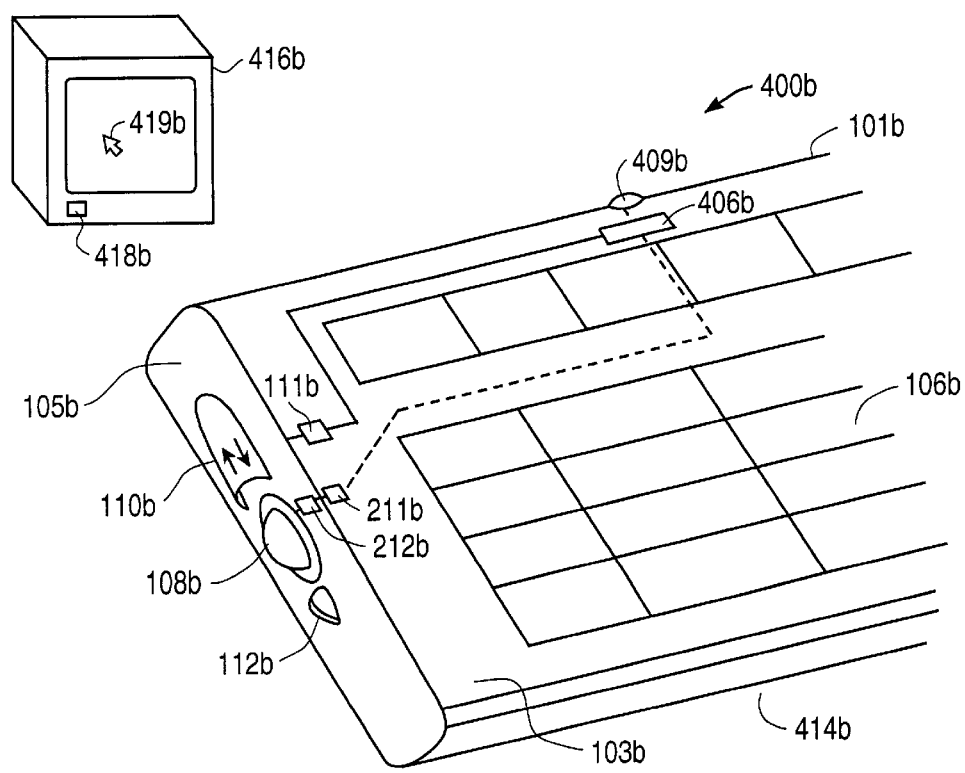
FIG_6B

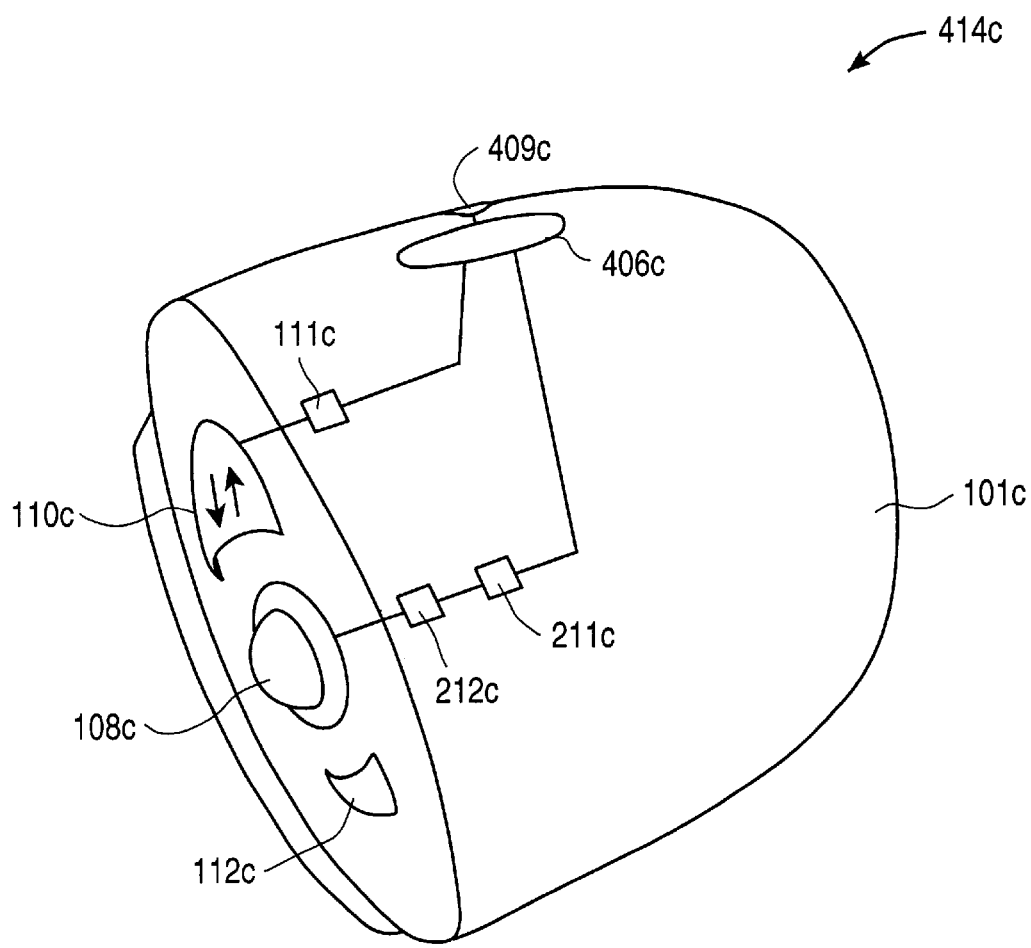
FIG_6C

TRACKBALL FOR SINGLE DIGIT CONTROL OF WIRELESS TERMINAL

BACKGROUND OF THE INVENTION

1. Field of the Invention

The present invention relates to cursor control devices and, particularly, to a trackball for single digit control of a wireless terminal.

2. Description of the Related Art

Wireless terminals including cellular telephones and other wireless telecommunication devices are providing increasingly sophisticated functionality. Functions performed by hand-held wireless terminals require an increasing degree of user input and interaction. For example, a typical wireless terminal includes a viewscreen, typically a liquid crystal display (LCD), a keypad, and a plurality of control buttons or switches to allow the user to scroll through menu options on the viewscreen. One such control is a dial which may be used to "roll" through menu options. Alternatively, forward and reverse buttons may be employed to accomplish this task. Finally, certain wireless terminals provide a trackball on the front face of the wireless terminal to position a cursor on the viewscreen. Each of these controls is also associated with a separate select button to allow selection of the menu item highlighted by the cursor.

In ergonomic terms, such menu selection or cursor pointing devices require relatively complex hand or finger movements. More particularly, such user interfaces have typically required the manipulation of a trackball, keys, or dial in order to locate a cursor on the view screen. A separate motion on a separate select key is required to select the item highlighted by the cursor. Frequently this is error-prone and counter-intuitive. Accordingly, there is a need for an improved user interface mechanism for a wireless terminal which is capable of being manipulated by a single finger in both cursor positioning and select modes.

The increasing functionality of wireless terminals also requires the display of increasing amounts of information on the viewscreen. The larger amounts of information generally require larger viewscreens. At the same time, however, the overall size of wireless terminals continues to decrease. Larger viewscreens also facilitate more user-friendly user interfaces, in particular, graphical user interfaces. Accordingly, there is a need for a user interface mechanism that increases the area of a wireless terminal that is available as viewscreen area.

In addition, wireless terminals are subjected to relatively severe operating conditions. Control buttons such as an on-switch may be jostled and thus unintentionally activated. Cursor controls may be exposed to scalding liquids, which can have a deleterious effect on their functionality. This is particularly the case when the control is a trackball, due to the electromechanical or optomechanical structure required to convert the ball's rotation into cursor movement. Accordingly, there is a need for an improved cursor control which is relatively immune from unintentional activation and/or liquid spillage.

SUMMARY OF THE INVENTION

These drawbacks in the prior art are overcome in large part by a side-mounted trackball including a sliding cover according to the present invention. A wireless terminal is provided including a key pad and a side mounted trackball. A sliding cover is provided which can slide over the trackball in an off position. When the cover is slid off the trackball, a biasing member upon which the trackball rests allows the trackball to pop out and in to position. The user can press down on the trackball in order to make a selection. In addition, the sliding cover is preferably an on-off switch for the wireless terminal.

According to one embodiment of the present invention, an electronic controller with an improved user interface is provided. The user interface includes a cursor pointing device and a controller housing adapted to receive the cursor pointing device. A control switch is coupled to the cursor pointing device and the controller housing, and is configured to be activated when the cursor pointing device is depressed. A sliding member is coupled to the controller housing. The sliding member is con figured to conceal the cursor pointing device when the sliding member is in a first position, and expose the cursor pointing device when the sliding member is in a second position. The sliding member also preferably functions as an on-off switch for the electronic controller or the device being controlled. The cursor pointing device is provided with a biasing member such that the biasing member positions the cursor pointing device in an inactive position when the sliding member is in the first position and is configured to position the cursor pointing device in an active position when the sliding member is in the second position.

A method for operating an electronic controller according to the present invention comprises sliding a sliding member from a first position to a second position on a controller housing. The sliding member conceals a cursor pointing device when the sliding member is in the first position, and exposes the cursor pointing device when the sliding member is in the second position. The method further comprises translating the cursor pointing device from an inactive position when the sliding member is in the first position to an active position when the sliding member is in the second position. Finally, the method further comprises using the cursor pointing device to position a cursor on a viewscreen, and depressing the cursor pointing device to select an item on the viewscreen positioned proximately to the cursor.

BRIEF DESCRIPTION OF THE DRAWINGS

A better understanding of the present invention is obtained when the following detailed description is considered in conjunction with the following drawings in which:

FIG. 1 is a diagram of a wireless terminal according to one embodiment of the present invention;

FIG. 2 is a block diagram illustrating a wireless terminal including a side mounted track ball or pointer according to an embodiment of the present invention;

FIGS. 3a, 3b and 3c are diagrams illustrating a cursor pointing device and sliding cover according to an embodiment of the present invention;

FIG. 4 is a diagram illustrating a cursor pointing device and sliding cover according to another embodiment of the present invention; and FIGS. 5a, 5b and 5c are diagrams illustrating the motion sensors of a pointing device according to one embodiment of the present invention.

FIGS. 6a, 6b, and 6c are diagrams illustrating another embodiment of the present invention.

DETAILED DESCRIPTION OF THE INVENTION

FIG. 1—Wireless Terminal With Side Mounted Track Ball

Turning now to FIG. 1, a diagram illustrating a wireless terminal 100, such as a cellular or PCS telephone, employing a side-mounted cursor pointing device 108 (in this case a trackball) having a sliding cover 110, is illustrated. Wireless terminal 100 includes a terminal housing 101 having a front or first face 103 and a second or side face 105. It is noted that while wireless terminal 100 is illustrated as having discrete faces 103 and 105, in alternate embodiments, terminal housing 101 may be generally cylindrical or ellipsoidal in shape, and thus not have discrete front and side faces. Accordingly, as used herein, the term "first side" and "second side" include first and second side portions, respectively. Terminal housing 101 includes a keypad or keyboard 106 preferably situated on front face 103. In the embodiment illustrated, a viewscreen 102 is also situated on front face 103. Viewscreen 102 preferably comprises a liquid crystal display (LCD) screen. In operation, viewscreen 102 includes a cursor 104 which is controlled through manipulation of the cursor pointing device 108, as will be described in greater detail below.

As illustrated, wireless terminal 100 further includes an antenna 114 projecting from housing 101, a speaker 116, and a microphone 118. It is noted that, while illustrated as a wireless terminal, a variety of grippable electronic devices are contemplated, such as personal digital assistants (PDA's), calculators, electronic remote controllers, electronic games, computers and the like. Thus, FIG. 1 is exemplary only.

Wireless terminal 100 further includes a sliding cover or sliding member 110 to at least partially conceal cursor pointing device 108. In addition to protecting cursor pointing device 108, sliding cover 110 preferably comprises an on/off switch for wireless terminal 100. A fixed or cooperating member 112 is preferably provided, such that when sliding cover 110 covers or conceals cursor pointing device 108, a more or less effective seal is effectuated. In the off position, the sliding cover 110 conceals and protects the pointing device 108, while in the on position, the sliding cover 110 exposes the cursor pointing device to view and/or operation.

As illustrated, cursor pointing device 108 is a trackball. However, it is noted that other types of cursor pointing devices, such as stick-type pointing devices, may be employed. As will be discussed in greater detail below, cursor pointing device 108 is configured to control movement of cursor 104 on view screen 102. Cursor 104 is used to highlight selections on view screen 102. The selections are then selected by depressing cursor pointing device 108, as will be described in greater detail below. The cursor pointing device 108 can be depressed in different manners to activate different functions. For example, a single, short duration depression can activate a first function, a combination of two, short duration depressions can activate a second function, and a depression of an extended duration can activate a third function. Such selections can include, for example, menu selections, numbers, or even letters for entering text. Thus, in one embodiment, no separate keypad is required and the viewscreen can, for instance, be made larger. Note that the viewscreen can already be made larger because providing a side mounted trackball can replace several keys on the front face 103 that would be used for cursor movement and activation in other designs. The surface area on the front face 103 that is freed up by removing the cursor control and activation keys can be used as additional viewscreen area.

FIG. 2—Block Diagram of Wireless Terminal

Turning now to FIG. 2, a block diagram of wireless terminal 100 employing a cursor pointing device 108 according to the present invention is illustrated. Wireless terminal 100 includes a cursor pointing device 108 which, as discussed above, preferably comprises a stick or trackball type cursor pointing device. Cursor pointing device 108 thus comprises a pointer 200 (which is either a stick or ball) coupled to movement translator 314. Movement translator 314 is configured to identify and convert motion of the pointer 200 into movement of cursor 104 on view screen 102. Movement translator 314 is coupled to an input controller 310. A switch 211 intercouples pointer 200 with input controller 310. When pointer 200 is depressed, switch 211 is closed and a corresponding signal is sent to input controller 310, thereby selecting the item on viewscreen 102 highlighted by the cursor. Input controller 310 is coupled to viewscreen 102 and to keyboard or keypad 106. As will be discussed in greater detail below, a biasing member 212 is preferably included. Biasing member 212 provides adequate tactile response for the cursor pointing device and/or enables the pointer to translate or "pop" into a more user-friendly position, when the unit is active, relatively higher than when inactive.

Wireless terminal 100 further includes an on-off switch 111 which is activated when sliding member 110 (FIG. 1) is slid off the top of the cursor pointing device. On-off switch 111 is thus coupled to a power supply unit 113, which in turn is coupled to provide power to the other functional units of wireless terminal 100. It is noted that in an alternate embodiment, on-off switch 111 is coupled to activate an on-off switch on a unit remote from wireless terminal 100.

In addition, wireless terminal 100 includes a transceiver and modulator unit 316 coupled to a control processor 315, which in turn is coupled to input controller 310. A microphone 120 and a speaker 118 are also coupled to control processor 315. Control processor 315 includes a central processing unit and a variety of other control circuitry (not illustrated). In the case of a cellular telephone, for example, such control circuitry is provided to control the switching of a telephone call between cells. The cursor pointing device is thus operable to, for example, dial a telephone via a video menu.

FIG. 3a, 3b and 3c—Trackball Cursor Pointing Device

Turning now to FIG. 3a, a more detailed diagram of a trackball-type cursor pointing device 108 for an electronic controller is illustrated. Cursor pointing device 108 includes a ball 200 and a locking collar 206 to hold ball 200 in place. A sliding member 110 and a fixed member 112 are coupled to controller housing 101. As illustrated, ball 200 is situated within a first housing 204. Trackball housing 204 includes motion sensors 518, 519 to identify movement of the ball 200. Motion sensors 518, 519 are coupled to a detection unit 214 comprised within controller housing 101, which translates the detected motion of the ball 200 into digital signals for controlling the cursor on the viewscreen. Detection unit 214 may be implemented in a central processor within controller housing 101. As illustrated, flexible leads 213 are provided to detection unit 214 situated within housing 101. It is noted that, in alternate embodiments, detection unit 214 is comprised within trackball housing 204.

Housing 204 operably couples ball 200 to a biasing member 212. Biasing member 212 comprises a spring or other biasing mechanism to maintain housing 204 and ball 200 in a state of tension. Biasing member 212 preferably maintains switch 211 in an open position. Switch 211 includes housing leads 208 and terminal leads 210. When the cursor pointing device is depressed, the switch 211 is closed and leads 208 come into contact with leads 210, thereby closing the connection.

In a preferred embodiment, biasing member 212 performs the additional function of causing ball 200 and/or housing 204 to translate or "pop up" when sliding cover 110 is slid off of ball 200. Thus, in operation, sliding cover 110 and ball 200 are preferably in sliding or rolling contact with one another. Sliding member 110 is further configured to be able to slide back on to ball 200 thereby concealing or protecting it. When in an active mode, the cursor pointing device is preferably disposed relatively higher than when inactive. Sliding member 110 is preferably coupled to a switch 111. Activation of on-off switch 111 preferably causes power to be supplied to the wireless controller or a remote unit.

FIGS. 3b and 3c illustrate a sliding mechanism of one embodiment of the present invention, where the sliding mechanism implements a mechanical interface between the housing 204 and the sliding member 110. The sliding mechanism comprises a pair of grooves 225 formed into opposite sides of the housing 204 and a pair of short ridges 227 formed at corresponding sides of the sliding member 110. One of the sides 204A into which a groove 225 is formed is labeled in both FIGS. 3a and 3b, for comparison. Also, an edge 110A of the sliding member 110 is labeled in both FIGS. 3a and 3c, for comparison. The grooves 225 and the ridges 227 are not illustrated in FIG. 3a, however.

Each ridge 227 engages with the corresponding groove 225 in a sliding relationship. Specifically, the ridges 227 penetrate the opening of the grooves 225, so that the relative motion between the ridges 227 and the grooves 225 is confined to the directions of the grooves 225. When the sliding member 110 is in an open position, the ridge 227 is at the right side of the groove 225 (the right side as viewed in FIG. 3b). When the sliding member 110 is moved toward the closed position, the ridge 227 moves toward the left within the groove 225. The ridge 227 imparts a force on the groove 225 in a downward direction. The downward force is sufficient to compress the biasing member 212, so that the housing 204, along with the ball 200, are pushed in toward the center of the controller housing 101. When the sliding member 110 is again moved toward the open position, the ridge 227 moves toward the right within the groove 225, and the housing 204 and the ball 200 again move away from the center of the controller housing 101.

FIG. 4—Side-Mounted Stick-Type Positioning Device

Turning now to FIG. 4, a diagram of a stick-type cursor positioning device 108d is shown. Stick 200d is coupled to a housing 204d and disposed within controller housing 101d. Springs 31 keep the stick 200d normally in a vertical position. However, the operator can press the stick 200d away from the vertical position. Sensors 32 are mounted at the bottom of the stick 200d and can detect in which direction the operator is pressing the stick and how hard he is pressing the stick. This information is then used to control the cursor.

In a manner similar to that described with regard to FIG. 4, housing 204d is coupled by way of spring or biasing member 212d to the terminal housing (not shown). A switch 211 is provided which, when the stick 200d is depressed, engages with a corresponding circuit trace in the terminal housing.

A sliding cover 101d and a fixed member 112d are provided on the wireless terminal housing. The sliding cover operates to conceal or protect the cursor pointing device when cooperatively engaged with the fixed member 112d. Additionally, sliding member 110d is coupled to a switch 111d. Switch 111d is preferably an on-off switch, which is activated when the sliding cover 110d is positioned to expose the cursor pointing device to view.

Sliding cover 110d and the cursor pointing device are preferably engageable in sliding contact such that when the sliding cover is positioned to expose the cursor pointing device to view, the cursor pointing device is translated or "pops up" from an inactive to an active position.

FIG. 5a, and 5c—Optomechanical Encoders

Turning now to FIG. 5, a more detailed diagram of the optomechanical encoders or motion sensors 518, 519 of FIG. 3a is shown. Turning now to FIG. 5A, which is a view from the top of the ball 200, the ball 200 is operably coupled to switch 211 such that, when the ball 200 is depressed, a control signal is sent to a controller (not shown).

In addition, ball 200 touches three rollers 18, 19 and 20. One roller 20 is free rolling; the other two rollers 18 and 19 form part of an optomechanical encoder. Rollers 18 and 19 are connected to systems for detecting the direction of the revolution of the roller, the length of rolling and also the speed of the rolling. One of the detection rollers 18 is referred to as the x axis controller and another roller 19 (90° off the x axis roller), is referred to as the y axis controller. These two rollers, 18 and 19, work independently. Each detection roller is coupled to a movement sensor 21 or 22, which is an electromechanical device used to sense the direction and speed of the roller movement.

FIGS. 5B and 5C show one method for implementing such a detection system. A disk 24 with a series of small holes 25 is mounted on the roller axle 26. A photodetection system 27 formed of a light transmitter 27A and a light receiver 27B senses each hole 25 as the disk 24 spins. With a proper design of the hole pattern, a detection unit 28 can detect the speed of the roller rotation, the direction and the length. The information about the direction and movement from both the x and y controllers are transferred to the cursor on the view screen. The ratio between the movement of the ball in the x and y direction and the corresponding movement of the cursor in the same directions may be set to suit the specific taste and requirements of the operator.

It is noted that while an electromechanical or optomechanical sensor system has been illustrated, an electromechanical system mounted upon the roller axles may be employed, as may any of a variety of purely optical systems.

FIGS. 6a, 6b and 6c—Remote Control Terminal

Turning now to FIG. 6a, a diagram of an alternate embodiment of the present invention is illustrated. Remote control system 400a includes a wireless terminal or remote or electronic controller 414a. Remote controller 414a includes a housing 101a and a keypad or keyboard 106a on a face of the controller housing. A cursor pointing device 108a, such as those illustrated in FIGS. 3 and 4, is provided. Cursor pointing device 108a controls a cursor 419a on video monitor or remote unit 416a. Motion sensors and a detection unit (not shown) are provided to convert movement of the cursor pointing device 108a into cursor movements on remote unit 416.

Remote controller 414a and video monitor 416a preferably communicate via a control signal generator 406a, such as an infrared signal generator and a lens 409a in remote controller 414a. The infrared signal is provided to an infrared sensor 418a in video monitor 416a. The received signals are provided to control circuitry (not shown) which translates the received signals into movements of the cursor 419a on the video screen. It is rioted that, while described with respect to infrared signals, a variety of other wireless or wire-connected media are contemplated.

Cursor pointing device 108a according to the present invention includes an integrated select switch 211a, similar to that described above, such that when cursor pointing device 108a is depressed, a select function is activated. For example, an area proximate to the cursor on the viewscreen is selected when the switch 211a is activated. The area may be representative of letters, or numbers, for example.

In addition, a sliding member 110a is provided on housing 101a. Sliding member 110a operates in conjunction with fixed member 112a to protect the cursor pointing device when the sliding member is in a first position, and to expose cursor pointing device 108a when the sliding member is in a second position. In a preferred embodiment, the cursor pointing device and the sliding member 110a are in sliding contact with one another.

A biasing member 212a is configured to position the cursor pointing device in an active position, relatively higher than the cursor pointing device's position when inactive, when the sliding member 110a is in the second position. Sliding member 110a also preferably engages an on-off switch or switch controller 111a. When engaged to expose the cursor pointing device to view, the sliding member 110a activates on-off switch 111a to turn on, or cause power to be provided to, the remote unit 416a.

Turning now to FIG. 6b, another embodiment of the present invention is illustrated. Remote control system 400b includes a computer keyboard or electronic controller 414b. Computer keyboard 414b includes a housing 101b and a keypad or keyboard 106b on a face of the controller housing. A cursor pointing device 108b, such as that illustrated in FIGS. 3 and 4, is provided. Cursor pointing device 108b controls a cursor 419b on video monitor or remote unit 416b. Motion sensors and a detection unit (not shown) are provided to convert movement of the cursor pointing device 108b into cursor movements on remote unit 416b.

Computer keyboard 414b and video monitor 416b preferably communicate via a control signal generator 406b, such as an infrared signal generator and a lens 409b in computer keyboard 414b. The infrared signal is provided to an infrared sensor 418b in video monitor 416b. The received signals are provided to control circuitry (not shown) which translates the received signals into movements of the cursor 419b on the video screen. It is noted that, while described with respect to infrared signals, a variety of other wireless or wire-connected media are contemplated, such as serial or parallel bus interfaces. In addition, keyboard 414b may be part of a laptop computer.

Cursor pointing device 108b according to the present invention includes an integrated select switch 211b, similar to that described above, such that when cursor pointing device 108b is depressed, a select function is activated. In addition, a sliding member 110b is provided on housing 101b. Sliding member 110b operates in conjunction with fixed member 112b to protect the cursor pointing device when the sliding member is in a first position, and to expose cursor pointing device 108b when the sliding member is in a second position.

A biasing member 212b is configured to position the cursor pointing device in an active position when the sliding member 110a is in the second position. Sliding member 110b also preferably engages an on-off switch or switch controller 111b. When engaged to expose the cursor pointing device to view, the sliding member 100b activates on-off switch 111b to turn on, or cause power to be provided to, the remote unit 416b.

It is noted that, while illustrated on a side of keyboard housing 101b, cursor pointing device 108b and sliding member 110b may be positioned on the same face of housing 101b as the keyboard itself. For example, the cursor pointing device 108b may be positioned below a space key on the keyboard.

Turning now to FIG. 6c, another embodiment of the present invention is illustrated. Electronic controller 414c comprises a stand-alone cursor pointing device, such as a trackball or joystick-type controller for a desktop computer. Electronic controller 414c includes a housing 101c. A cursor pointing device 108c, such as that illustrated in FIGS. 3 and 4, is provided. Cursor pointing device 108c controls a cursor on a video monitor (not shown). Motion sensors and a detection unit (riot shown) are provided to convert movement of the cursor pointing device 108c into cursor movements on the monitor screen. Again, the controller preferably communicates with a remote unit via a control signal generator 406c, which may be an infrared signal generator and a lens 409c. However, a variety of other wired or wireless interfaces are contemplated, such as serial or parallel bus interfaces.

Cursor pointing device 108c according to the present invention includes an integrated select switch 211c, similar to that described above, such that when cursor pointing device 108c is depressed, a select function is activated. In addition, a sliding member 110c is provided on housing 101c. Sliding member 110b operates in conjunction with fixed member 112c to protect the cursor pointing device when the sliding member is in a first position, and to expose cursor pointing device 108c when the sliding member is in a second position.

A biasing member 212c is configured to position the cursor pointing device in an active position when the sliding member 110c is in the second position. In one embodiment, sliding member 110c also preferably engages an on-off switch or switch controller 111c. When engaged to expose the cursor pointing device to view, the sliding member 110c activates on-off switch 111c to turn on, or cause power to be provided to, the computer. Alternatively, activation of the on-off switch causes the computer to wake from a "sleep" mode.

The invention described in the above detailed description is not intended to be limited to the specific form set forth herein, but on the contrary, it is intended to cover such alternatives, modifications and equivalents as can reasonably be included within the spirit and scope of the appended claims.

What is claimed is:

1. An electronic controller for controlling the operation of an electronic apparatus, the electronic controller comprising:
   a controller housing;
   a cursor pointing device comprised in the controller housing;
   a sliding member substantially similar in size to said cursor pointing device, and a fixed member coupled to the controller housing wherein the sliding member is configured to at least partially conceal the cursor pointing device when the sliding member is in a first position and is configured to expose the cursor pointing device when the sliding member is in a second position, wherein the cursor pointing device is operable to receive user input to control the operation of the electronic apparatus when the sliding member is in the second position; and
   a control switch operably coupled to the cursor pointing device and comprised in the controller housing, wherein the control switch is configured to be activated when the cursor pointing device is depressed.

2. The electronic controller of claim 1, further comprising a switch comprised in the controller housing and coupled to the sliding member, wherein the switch is configured to be activated when the sliding member is in the second position and is configured to be deactivated when the sliding member is in the first position.

3. The electronic controller of claim 2, wherein the cursor pointing device is configured to be operated by a single digit of a user's hand.

4. The electronic controller of claim 2, wherein the cursor pointing device is positioned in a location of the controller housing such that, when the controller is in operation, a user's thumb is proximate to the cursor pointing device, thereby allowing the user's thumb to control the cursor pointing device.

5. The electronic controller of claim 2, wherein the switch is an on-off switch, wherein activation of the on-off switch provides power to the electronic controller.

6. The electronic controller of claim 2, wherein the switch is an on-off switch, wherein activation of the on-off switch causes power to be provided to a remote unit.

7. The electronic controller of claim 2, further comprising a biasing member comprised in the controller housing, wherein the cursor pointing device is in biasing contact with the biasing member such that the biasing member is configured to position the cursor pointing device in an inactive position when the sliding member is in the first position and the biasing member is configured to position the cursor pointing device in an active position when the sliding member is in the second position.

8. The electronic controller of claim 7, wherein the active position of the cursor pointing device is relatively higher than the inactive position.

9. The electronic controller of claim 2, wherein the cursor pointing device comprises a trackball.

10. The electronic controller of claim 2, wherein the cursor pointing device comprises a stick pointer.

11. A method for operating an electronic controller, comprising steps of:

sliding a sliding member on a controller housing from a first position to a second position, wherein the sliding member at least partially conceals a cursor pointing device when the sliding member is in the first position, and the sliding member exposes the cursor pointing device when the sliding member is in the second position, said sliding member being substantially similar to size to said cursor pointing device;

translating the cursor pointing device from an inactive position when the sliding member is in the first position, to an active position relatively higher than the inactive position, when the sliding member is in the second position;

using the cursor pointing device to position a cursor on a viewscreen; and depressing the cursor pointing device to select an item on the viewscreen positioned proximately to the cursor.

12. The method of claim 11, further comprising a step of sliding the sliding member from the second position to the first position to conceal the cursor pointing device.

13. The method of claim 12, further comprising a step of translating the cursor pointing device from the active position to the inactive position when the sliding member is slid from the second position to the first position.

14. The method of claim 11, wherein the step of sliding the sliding member from the first position to the second position comprises a step of activating a switch which controls a power source.

15. The method of claim 11, wherein the step of sliding the sliding member from the second position to the first position causes the sliding member to be in contact with the cursor pointing device.

16. The method of claim 11, wherein the step of depressing the cursor pointing device comprises a step of depressing a control switch.

17. A wireless terminal comprising:

a housing, the housing comprising:

a first surface defining a first tangent; and a second surface defining a second tangent, the second tangent being substantially perpendicular to the first tangent;

a viewscreen mounted in the first surface and configured to be substantially parallel to the first tangent;

a cursor pointing device mounted in the second surface, whereby a user can operate the cursor pointing device with the user's thumb while holding the wireless terminal at an orientation that allows the user to view the viewscreen;

a sliding member substantially similar in size to said cursor pointing device, and a fixed member coupled to the housing wherein the sliding member is configured to at least partially conceal the cursor pointing device when the sliding member is in a first position and is configured to expose the cursor pointing device when the sliding member is in a second position, wherein the cursor pointing device is operable to receive user input to control the operation of the wireless terminal when the sliding member is in the second position; and a control switch operably coupled to the cursor pointing device and comprised in the controller housing, wherein the control switch is configured to be activated when the cursor pointing device is depressed.

18. The wireless terminal of claim 17, further comprising a switch comprised in the housing and coupled to the sliding member, wherein the switch is configured to be activated when the sliding member is in the second position and is configured to be deactivated when the sliding member is in the first position.

\* \* \* \* \*